United States Patent
Fennel et al.

(10) Patent No.: US 6,431,663 B1
(45) Date of Patent: Aug. 13, 2002

(54) PROCESS AND DEVICE TO IMPROVE THE REGULATING ACTION OF AN ANTI-LOCK BRAKING SYSTEM

(75) Inventors: Helmut Fennel, Bad Soden; Holger Schmidt, Wettenberg; Ivica Batistic, Frankfurt am Main, all of (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 09/308,873

(22) PCT Filed: Oct. 23, 1997

(86) PCT No.: PCT/EP97/05849

§ 371 (c)(1),
(2), (4) Date: Aug. 12, 1999

(87) PCT Pub. No.: WO98/23472

PCT Pub. Date: Jun. 4, 1998

(30) Foreign Application Priority Data

Nov. 26, 1996 (DE) .......................................... 196 48 909

(51) Int. Cl.⁷ ................................................. B60T 8/60
(52) U.S. Cl. ........................ 303/147; 303/146; 303/140
(58) Field of Search ................................ 303/146, 147, 303/140

(56) References Cited

U.S. PATENT DOCUMENTS

| | | | | |
|---|---|---|---|---|
| 4,898,431 A | * | 2/1990 | Karnopp et al. ............. | 303/100 |
| 5,134,352 A | * | 7/1992 | Matsumoto et al. ........ | 318/587 |
| 5,219,212 A | * | 6/1993 | Shimada et al. .............. | 303/92 |
| 5,228,757 A | * | 7/1993 | Ito et al. ..................... | 303/100 |
| 5,265,946 A | * | 11/1993 | Bader ........................... | 303/96 |
| 5,685,618 A | * | 11/1997 | Uchida et al. ............... | 303/146 |
| 5,711,025 A | * | 1/1998 | Eckert et al. ................. | 701/83 |
| 5,717,591 A | * | 2/1998 | Okada et al. ......... | 364/426.027 |
| 5,727,853 A | * | 3/1998 | Monzaki ..................... | 303/140 |
| 5,762,406 A | * | 6/1998 | Yasui et al. ................. | 303/146 |
| 5,774,821 A | * | 6/1998 | Eckert .......................... | 701/78 |
| 5,813,732 A | * | 9/1998 | Monzaki et al. ............. | 303/146 |
| 5,826,951 A | * | 10/1998 | Sano ........................... | 303/146 |
| 5,832,402 A | * | 11/1998 | Brachert et al. .............. | 701/72 |
| 5,878,357 A | * | 3/1999 | Sivashankar et al. .......... | 701/1 |
| 5,908,225 A | * | 6/1999 | Meier et al. ................. | 303/146 |
| 5,915,800 A | * | 6/1999 | Hiwatashi et al. .......... | 303/146 |
| 6,003,959 A | * | 12/1999 | Katayose et al. ........... | 303/146 |
| 6,086,168 A | * | 7/2000 | Rump ......................... | 303/191 |
| 6,132,014 A | * | 10/2000 | Kiso et al. .................. | 303/146 |
| 6,176,555 B1 | * | 1/2001 | Semsey ........................ | 303/7 |

FOREIGN PATENT DOCUMENTS

| | | |
|---|---|---|
| DE | 39 39 069 | 5/1991 |
| DE | 41 09 522 | 9/1991 |
| DE | 41 22 768 | 3/1992 |
| DE | 41 41 877 | 6/1992 |
| DE | 41 23 235 | 11/1992 |
| DE | 42 22 958 | 1/1994 |
| DE | 43 05 155 | 8/1994 |
| DE | 44 18 771 | 10/1995 |
| DE | 195 22 632 | 1/1997 |
| EP | 0 293 561 | 12/1988 |
| EP | 0 363 959 | 4/1990 |
| EP | 2 662 982 | 12/1991 |
| GB | 2 157 381 | 10/1985 |

* cited by examiner

Primary Examiner—Paul N. Dickson
Assistant Examiner—Benjamin A Pezzlo
(74) Attorney, Agent, or Firm—Rader, Fishman & Grauer PLLC

(57) ABSTRACT

To improve the control behavior of an anti-lock brake system, which also permits active braking intervention when the brake pedal is not applied, braking pressure is introduced into the wheel brake of the bend-outward front wheel, or asymmetrically into the wheel brakes of both front wheels upon identification of a cornering situation and simultaneous deceleration of the vehicle if additionally the slip on the bend-outward rear wheel exceeds the slip on the bend-outward front wheel. 'Veering' or overspinning of the vehicle is this way counteracted.

11 Claims, 2 Drawing Sheets

PROCESS AND DEVICE TO IMPROVE THE REGULATING ACTION OF AN ANTI-LOCK BRAKING SYSTEM

TECHNICAL FIELD

The present invention relates to a method and a device for improving the control behavior of an anti-lock brake system adapted for active braking intervention, more particularly for maintaining the driving stability and for improving vehicle steerability.

BACKGROUND OF THE INVENTION

It is known in the art to extend the functions of an ABS system by employing the system for improving the driving stability or brake stability during cornering. Such a control management is effected during partial braking, i.e., during a braking operation where the ABS response thresholds are not reached. A stabilizing moment about the vertical axis of a vehicle is produced by specifically retarding the braking pressure increase on the bend-inward wheels, which is caused by application of the brakes, in comparison to the braking pressure on the bend-outward wheels ('Brake System and Slip Control System of the new BMW 7-series, ATZ 97 (1995), pages 8–15, and 'Brake System and Slip Control Systems of the new BMW 5-series', ATZ 98 (1996), pages 188–194). When no steering angle sensor is used, the information about the current steering angle is derived from the transverse acceleration of the vehicle, which, in turn, is calculated from the wheel sensor signals.

German patent application No. 39 39 069 discloses an automotive vehicle wherein a signal is produced upon the occurrence of a predetermined brake slip and/or lateral slip on the rear wheels without brake operation. There is provision of a cornering identification device, which identifies cornering and the type of the bend. When cornering is identified, the brake is not applied, and in the presence of longitudinal slip on the wheels, braking pressure is introduced on the rear axle, preferably, only on the brake of the bend-outward rear wheel. The objective is to increase the cornering force on the bend-outward rear wheel and to counteract veering of the vehicle.

German patent No. 34 13 738 (P5547) discloses an anti-lock control system (ABS) with a cornering identification circuit, which is also based on wheel slip measurement. For cornering identification, the slip values on the wheels of one vehicle side are added, compared to the slip sum of the wheels on the other vehicle side, and a cornering identification signal is generated as soon as the difference of the slip sums exceeds a predetermined limit value. During cornering identification, selection criteria such as 'select-low' or 'select-high', according to which the pressure variation in the individual braking pressure control channels of this brake system is controlled, as well as limit values for the selection criteria becoming effective are varied. This way, the control is conformed to the different conditions prevailing during straight travel and during cornering.

Beyond a partial braking operation, stabilizing a vehicle by braking intervention is of course possible only if braking pressure can be generated in the brake system and/or in the wheel brakes even without application of the brake pedal or without operation of the braking pressure generator. Known brake systems with traction slip control (TCS) and/or driving stability control (DSC, ASMS, etc.) are capable of active braking intervention.

The prior art driving stability control systems are equipped with yaw rate sensors, steering angle sensors, etc., which are required in addition to the wheel speed sensors, and with sophisticated processing and monitoring systems. When yaw torques are detected, which jeopardize driving stability, evaluation of all measured values is followed by selectively controlling the wheel brakes to generate a balancing and stabilizing yaw torque about the vertical axis of the vehicle.

An object of the present invention is to improve the control behavior of an anti-lock brake system and to extend the control functions in a simple way and with at most little additional effort and structure in order to maintain the steerability and driving stability of the vehicle during cornering even when the brake is not applied.

It has been found that this object can be achieved in a very simple manner by the method of the present invention. Thus, the special features of the method of the present invention include that, when the following conditions, i.e., cornering situation the vehicle decelerates although the brake is not applied, are simultaneously identified or satisfied, a critical slip condition is confirmed, which indicates veering of the vehicle or that a bend limit range is reached.

When these conditions are simultaneously found, a special control is started, which causes braking pressure delivery at least into the wheel brake of the bend-outward front wheel.

It has proved expedient in some cases to limit the delivery of braking pressure exclusively to the bend-outward front wheel. An asymmetrical braking pressure introduction into both front-wheel brakes is preferred in other cases. Principally, the higher braking pressure is required on the bend-outward front wheel to stabilize the vehicle, which tends to veer. Decelerating both front wheels is advantageous because the imminent instability is typically caused by a too high speed in the bend, which is not in conformity with requirements.

According to another preferred aspect of the present invention, the occurrence of a higher slip on the bend-outward rear wheel in comparison to the bend-outward front wheel is assessed as a criterion for that the critical slip condition is satisfied. This slip ratio indicates the 'veering' of the vehicle or that the bend limit range is reached due to cornering at too high speed.

It is also possible to determine and analyze the instantaneously fastest vehicle wheel instead of scrutinizing the slip. When the bend-outward front wheel rotates at the highest speed, and this comparison is made on the basis of filtered wheel signals, the critical condition has occurred, i.e., a higher slip on the bend-outward rear wheel compared to the bend-outward front wheel.

The stabilizing introduction of braking pressure into the bend-outward front wheel or asymmetrically into both front wheels is expediently effected by one single braking pressure introduction pulse of e.g. 200–300 msec or by a corresponding pulse train. On the other hand, the special control and, thus, the pressure introduction can be continued until the critical slip condition no longer prevails or, in other words, until the bend-outward wheels signal approximately the same amount of slip.

An algorithm for identifying cornering and some further favorable embodiments of the present invention, including a device for implementing the method of the present invention, are also described.

DETAILED DESCRIPTION OF THE PREFERRED EMBODIMENTS

Figure 1:
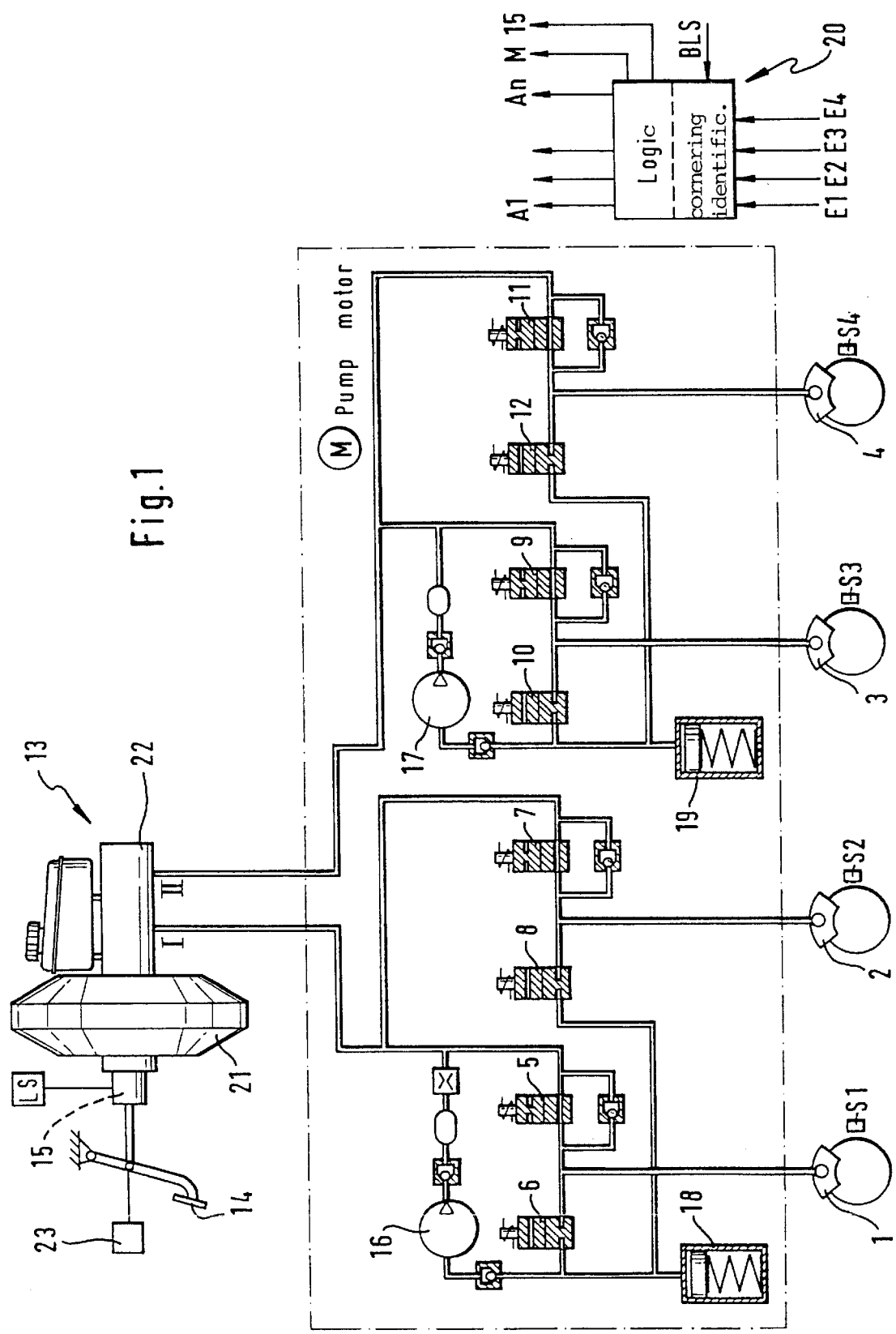
FIG. 1 is a schematic view of the most important components of a brake system for implementing the method of the present invention.

In a favorable embodiment to which FIG. 1 is related, a device for implementing the method of the present invention generally includes a conventional anti-lock system with a brake force booster whose maximally attainable boosting force can be achieved irrespective of brake pedal depression, and an electronic controller, which performs cornering identification and the monitoring of the above-mentioned criteria as well as switch-over to the special control. FIG. 1 shows a symbolic view of a dual-circuit hydraulic brake system with an individual control of the braking pressure in the individual wheel brakes.

Associated with each wheel brake 1, 2, 3, 4 is an inlet/outlet valve pair 5,6; 7,8; 9,10; 11,12. All valves are electrically operable two-way/two-position directional control valves. The inlet valves 5, 7, 9, 11 are switched to open passage in their inactive position, and the outlet valves 6, 8, 10, 10 are closed in their inactive position.

Provided as a dual-circuit braking pressure generator 13 is an active brake force booster, which is adapted to be activated or whose maximum boosting force can be attained irrespective of the operation of a brake pedal 14. The brake force booster is composed of a vacuum booster 21 and a tandem master cylinder 22. The booster in the example shown is a so-called on/off booster 21, which can be operated on command of an electric signal sent to a control valve 15. This booster has only two switch positions and, therefore, can be manufactured with comparatively low additional effort and structure compared to a conventional passive brake force booster. It must only be ensured in the on-position of the on/off booster that the pressure fluid, which is supplied by hydraulic pumps 16, 17 in case of need, is not allowed to discharge via the master cylinder of the braking pressure generator.

The two hydraulic pumps 16, 17 are jointly operated in a known fashion by way of a represented electric drive motor M. On the suction side of the pump 16, 17, each brake circuit I, II still includes a low-pressure accumulator 18, 19, which supports the quick pressure reduction when the outlet valves 6, 8, 10, 12 open before start of the hydraulic pumps 16, 17.

The controlled brake system still includes wheel sensors S1–S4 whose output signals represent the rotational behavior of the individual vehicle wheels VR, VL, HR, HL, and an electronic controller 20, which is shown as a black box in FIG. 1. Among others, the sensor signals are sent to the controller 20 by way of the inputs E1–E4 indicated. The output signals A1—An of the controller 20 are conducted to the individual electrically operable hydraulic valves 5–12. the drive motor M of the hydraulic pumps 16. 17 and the control valve 15 at the inlet of the active booster 21.

A brake light switch 23 (BLS) is also indicated in FIG. 1 in conjunction with the brake force booster 21. The switch is a pedal travel switch, for example, having a switch position, which permits recognizing whether any one of the conditions required for activation of the special control of the present invention, i.e., brake pedal application, is satisfied. Consequently, the output signal of the brake light switch 23 is also sent to the electronic controller 20.

In the controller 20, which comprises complex circuits and microcomputers for processing the input data in the present case, the presence of a cornering situation is identified by analysis of the slip values, which are produced on the basis of the wheel sensor signals and a vehicle reference speed $V_{REF}$ derived from the signals. If, in addition (by analysis of the wheel sensor signals), vehicle deceleration is detected although the brake is not operated, it is only necessary that the critical 'slip condition' is satisfied in order to initiate the special control. As has been explained hereinabove, a higher slip value on the bend-outward rear wheel in comparison to the slip on the bend-outward front wheel indicates 'veering' of the vehicle or that the bend limit range is reached, and thus, an imminent instability of the vehicle. Due to a short pressure increase pulse, which causes the introduction of braking pressure into the wheel brake of the bend-outward front wheel, veering of the vehicle or oversteering in this cornering situation is counteracted upon commencement of the special control, and driving stability is reestablished.

An asymmetrical braking pressure introduction into the wheel brakes of the two front wheels (with the higher braking pressure developing on the bend-outward front wheel) has also favorable effects on driving stability because slowing down of the vehicle, which is too quick in this cornering situation, is principally favorable for driving stability.

In general, one single pressure increase pulse of e.g. 200–300 msec is deemed sufficient. The optimal or most favorable pressure introduction is of course greatly dependent on the respective vehicle construction and the driving situation.

It is also possible to continue with the pressure introduction until the slip conditions on the bend-outward vehicle wheels indicate that stability has been reestablished.

A cornering situation is represented by a speed difference value $\Delta v$, the exceeding of which is assessed as cornering identification and, thus, as complying with the corresponding conditions for commencement of the special control according to the present invention.

Figure 2:
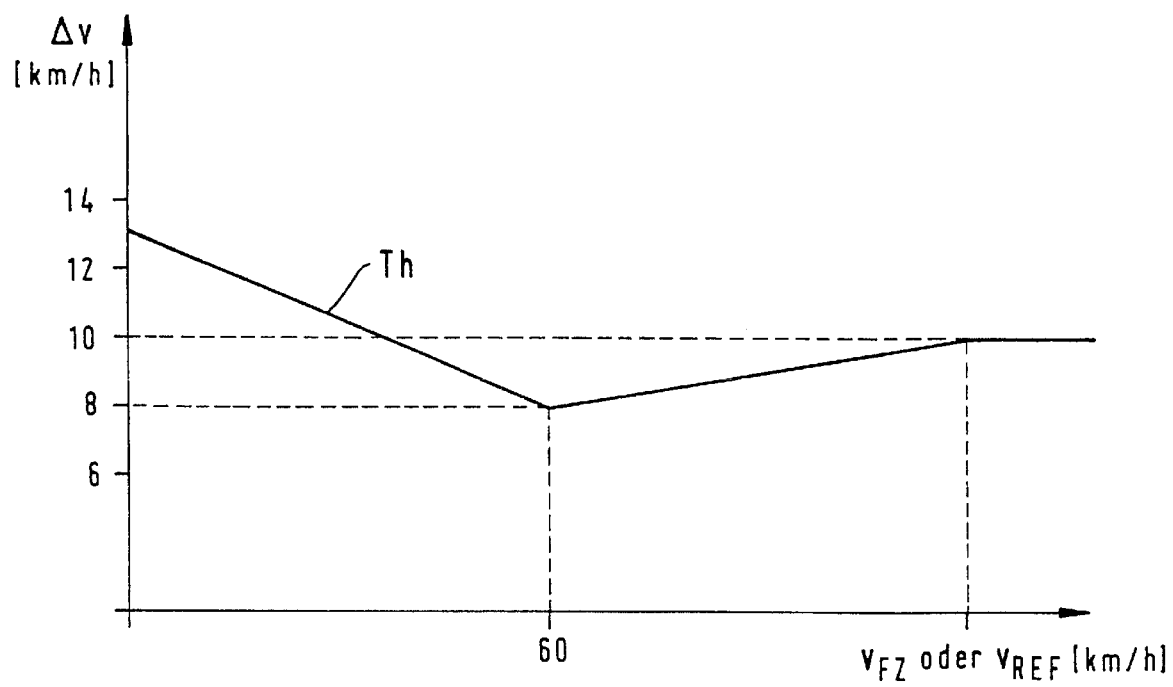
FIG. 2 is a diagram showing the relationship between the slip difference limit value and the vehicle speed according to an embodiment of the present invention.

The limit value Th for the assessment of this speed difference value $\Delta v$ is in the order of magnitude between 8 and 13 km/h, for example. The FIG. 2 embodiment illustrates a variable limit value Th, which depends on the instantaneous vehicle speed $V_{FZ}$ or vehicle reference speed $V_{REF}$. In a bottom speed range, which is between 0 and 60 km/h in FIG. 2, the limit value Th is decreased linearly from initially 13 km/h to 8 km/h. In the medium speed range between 60 and 120 km/h, there follows a linearly rising limit value Th, which, finally, at high speeds appropriately adopts a (roughly) constant value of e.g. 9 km/h. Of course, the cornering characteristic curve shown is conformed to a defined vehicle. With a different vehicle construction, either a limit value, which remains constant over the entire speed range, or a completely different characteristic curve is possible.

Thus, an extension of an anti-lock system, which is relatively simple and can be achieved by low effort, e.g., by using an active braking pressure generator and monitoring the described criteria, permits enhancing the driving stability and steerability during cornering according to the present invention. Other embodiments and provisions for active braking intervention, for example, on the basis of the so-called brake assistant, or by using preloading pumps, etc., can also be used to improve the control behavior in the situation described hereinabove.

Identification and analysis of the described criteria, that is identifying a cornering situation and a veering tendency by scrutinizing the slip, evaluating the brake light switch signal, etc., is also based on simple calculations, which, therefore, can be performed with low effort. Thus, the control improvement according to the present invention necessitates only very little additional effort and structure in total.

What is claimed is:

1. A method of improving the control behavior of an anti-lock brake system adapted for active braking intervention, wherein a vehicle reference speed is derived from the rotational behavior of the vehicle wheels and criteria for identifying a cornering situation and the direction of a bend are produced, comprising the steps of:

detecting a cornering event by analyzing the rotational behavior of the vehicle wheels, simultaneously determining if deceleration of the vehicle occurs, with no brake applied, determining if a critical slip condition indicating veering of the vehicle or a bend limit range is satisfied, and commencing a special control by introducing braking pressure at least into the wheel brake of the bend-outward front wheel provided the above determinations yielded positive results wherein the occurrence of a higher brake slip on the bend-outward rear wheel in comparison with the bend-outward front wheel is assessed as a critical slip condition wherein for identifying a situation with higher brake slip on the bend-outward rear wheel in comparison with the bend-outward front wheel, the wheel with the instantaneously highest rotational speed is determined on the basis of filtered wheel speed signals.

2. Method as claimed in claim 1, wherein braking pressure is introduced exclusively into the wheel brake of the bend-outward front wheel when the critical slip condition occurs.

3. Method as claimed in claim 1, further including introducing braking pressure into the wheel brakes of both front wheels when the critical slip condition occurs, and the braking pressure introduction on the bend-outward front wheel is performed with a higher increase gradient and/or for a longer period of time.

4. Method as claimed in claim 1, further including calculating a speed difference value ($\Delta v$), which represents the difference between the wheel speed sums of both vehicle sides, according to the relation $\Delta v = |(V1+V4)-(V2+V3)| > Th$ and V1 is the speed of the left front wheel V2 is the speed of the right front wheel V3 is the speed of the right rear wheel V4 is the speed of the left rear wheel Th is the speed limit value, wherein a cornering situation is identified when the speed difference value $\Delta v$ adopts a predetermined limit value (Th) which is in the order between 5 and 20 km/h.

5. Method as claimed in claim 4, further including varying the speed limit value (Th) as a function of at least one of the vehicle speed ($v_{FZ}$) or the vehicle reference speed ($v_{REF}$).

6. Method as claimed in claim 5, further including reducing, the limit value (Th) in a bottom vehicle speed range (<60 km/h) with rising vehicle speed is reduced from an initial maximum value to a minimum value, increases in a medium speed range with rising vehicle speed, and is maintained approximately constant in a higher speed range.

7. Method as claimed in claim 1, wherein the braking pressure introduction, as a result of the special control, is effected by a pressure increase pulse with a duration of roughly 100 to 500 ms, more particularly 100 to 300 ms, or by a corresponding pressure increase pulse train.

8. Method as claimed in claim 1, wherein the braking pressure introduction is terminated as soon as the critical slip condition is no longer satisfied.

9. A method of improving the control behavior of an anti-lock brake system adapted for active braking intervention, wherein a vehicle reference speed is derived from the rotational behavior of the vehicle wheels and criteria for identifying a cornering situation and the direction of a bend are produced, comprising the steps of:

detecting a cornering event by analyzing the rotational behavior of the vehicle wheels, simultaneously determining if deceleration of the vehicle occurs, with no brake applied, determining if a critical slip condition indicating veering of the vehicle or a bend limit range is satisfied, and commencing a special control by introducing braking pressure at least into the wheel brake of the bend-outward front wheel provided the above determinations yielded positive results, further including calculating a speed difference value ($\Delta v$), which represents the difference between the wheel speed sums of both vehicle sides, according to the relation $\Delta v = |(V1+V4)-(V2+V3)| > T$ and V1 is the speed of the left front wheel V2 is the speed of the right front wheel V3 is the speed of the right rear wheel V4 is the speed of the left rear wheel Th is the speed limit value, wherein a cornering situation is identified when the speed difference value $\Delta v$ adopts a predetermined limit value (Th) which is in the order between 5 and 20 km/h.

10. Method as claimed in claims 9, further including varying the speed limit value (Th) as a function of at least one of the vehicle speed ($v_{FZ}$) or the vehicle reference speed ($v_{REF}$).

11. Method as claimed in claim 10, further including reducing, the limit value (Th) in a bottom vehicle speed range (<60 km/h) with rising vehicle speed is reduced from an initial maximum value to a minimum value, increases in a medium speed range with rising vehicle speed, and is maintained approximately constant in a higher speed range.

* * * * *